US005454904A

United States Patent [19]
Ghezzo et al.

[11] Patent Number: 5,454,904
[45] Date of Patent: Oct. 3, 1995

[54] MICROMACHINING METHODS FOR MAKING MICROMECHANICAL MOVING STRUCTURES INCLUDING MULTIPLE CONTACT SWITCHING SYSTEM

[75] Inventors: Mario Ghezzo, Ballston Lake; Richard J. Saia, Schenectady; Bharat S. Bagepalli, Schenectady; Imdad Imam, Schenectady, all of N.Y.; Dennis L. Polla, Brooklyn Park,, Minn.

[73] Assignee: General Electric Company, Schenectady, N.Y.

[21] Appl. No.: 286,722

[22] Filed: Aug. 5, 1994

Related U.S. Application Data

[62] Division of Ser. No. 172, Jan. 4, 1993, Pat. No. 5,374,792.

[51] Int. Cl.⁶ .............................. B44C 1/22; B29C 37/00; C23F 1/00
[52] U.S. Cl. .................. 216/13; 156/643.1; 156/656.1; 216/17; 216/72
[58] Field of Search ..................... 156/643, 654, 156/655, 656, 657, 668, 901, 902; 219/121.68, 121.69; 200/16 B, 279; 307/112

[56] References Cited

U.S. PATENT DOCUMENTS

| | | | |
|---|---|---|---|
| 4,658,227 | 4/1987 | Howell et al. | 335/174 |
| 4,698,607 | 10/1987 | Howell | 335/195 |
| 4,700,256 | 10/1987 | Howell | 361/13 |
| 4,705,923 | 11/1987 | Howell | 200/144 B |
| 4,714,516 | 12/1987 | Eichelberger et al. | 156/628 |
| 4,717,796 | 1/1988 | Howell | 200/144 B |
| 4,717,798 | 1/1988 | Howell | 200/144 B |
| 4,723,187 | 2/1988 | Howell | 361/13 |
| 4,725,701 | 2/1988 | Howell | 200/144 B |
| 4,764,485 | 8/1988 | Loughran et al. | 437/225 |
| 4,780,177 | 10/1988 | Wojnarowski et al. | 156/643 |
| 4,783,695 | 11/1988 | Eichelberger et al. | 357/65 |
| 4,808,549 | 2/1989 | Mikkor et al. | 156/647 X |
| 4,835,704 | 5/1989 | Eichelberger et al. | 364/490 |
| 4,842,677 | 6/1989 | Wojnarowski et al. | 156/643 |
| 4,894,115 | 1/1990 | Eichelberger et al. | 156/643 |
| 4,896,098 | 1/1990 | Haritonidis et al. | 324/663 |
| 4,943,750 | 7/1990 | Howe et al. | 310/309 |
| 4,997,521 | 3/1991 | Howe et al. | 156/651 |

OTHER PUBLICATIONS

R. B. Brown et al., "Characteristics of Molybdenum Thin Films for Micromechanical Structures", Proc. IEEE Microelectromechanical Systems, An Investigation of Microstructures, Sensors, Actuators, Machines and Robots, Napa Valley, Calif 11–14 Feb. 1990, pp. 77–81.

*Primary Examiner*—William Powell
*Attorney, Agent, or Firm*—Marvin Snyder

[57] ABSTRACT

Micromachining methods for fabricating micromechanical structures which include plunger elements free to reciprocate within cavities are fabricated using processing steps in common with those employed in high density interconnect (HDI) technology for multi-chip module packaging. A polymer, such as a polyimide, is utilized as a micromachinable material. In one embodiment, cavities are formed in the polymer material by laser ablation, employing a sacrificial layer as a mask. Electroplated copper may be employed as a sacrificial release layer. One particular structure is a micromechanical electric switch including an array of individual switch contacts actuatable in common.

27 Claims, 18 Drawing Sheets

MICROMACHINING METHODS FOR MAKING MICROMECHANICAL MOVING STRUCTURES INCLUDING MULTIPLE CONTACT SWITCHING SYSTEM

This application is a division, of application Ser. No. 08/000/172, filed Jan. 4, 1993, U.S. Pat. No. 5,374,792.

BACKGROUND OF THE INVENTION

The present invention relates generally to micromachining methods and corresponding micromechanical structures produced by micromachining. More particularly, the invention relates to micromachined relays for electric current switching and current-interrupting circuit breaker technology, arrays of micromechanical electric switches which may be used to replace a conventional, relatively bulky, current-interrupting electric switch or relay device, micromechanical structures which include a plunger element free to reciprocate within a cavity, and micromachining methods for forming such structures, and micromachining methods which are compatible with fabrication technologies used to make multi-chip electronic modules.

The subject invention is related to the invention of commonly-assigned Bagepalli et al. application Ser. No. 08/000, 313, filed concurrently herewith, entitled "Current Interrupting Device Using Micromechanical Components" the entire disclosure of which is hereby expressly incorporated by reference.

Micromachining is a recent technology for fabricating micromechanical moving structures. In general, semiconductor batch fabrication techniques are employed to achieve what is in effect three-dimensional machining of single-crystal and polycrystalline silicon and silicon dielectrics, producing such structures as micromotors and microsensors. Thus, except for selective deposition and removal of materials on a substrate, conventional assembly operations are not involved. By way of example, a microsensor is disclosed in Haritonidis et al U.S. Pat. No. 4,896,098; and an electrostatic micromotor is disclosed in Howe et al U.S. Pat. Nos. 4,943,750 and 4,997,521.

A temporary structure known alternatively as a release layer or as a sacrificial layer is critical for micromachining because it allows moving parts to be formed by self-registered casting methods, with subsequent selective etching to remove the sacrificial layer. Since micromachining originated from the technology of silicon integrated circuit processing, low-temperature $SiO_2$ is commonly employed as the sacrificial layer material.

Silicon is not the only material that has been employed in micromachining. Micromechanical properties of sputtered molybdenum are discussed in the paper by Richard B. Brown, Muh-Ling Ger and Tri Nguyen, "Characteristics of Molybdenum Thin Films for Micromechanical Structures" Proceedings IEEE Microelectromechanical Systems, An Investigation of Microstructures, Sensors, Actuators, Machines and Robots, Napa Valley, Calif., 11–14 Feb. 1990 (IEEE Cat. No. 90CH2832-4). Brown et al also suggest use of sputtered aluminum as a sacrificial layer in order to increase etch selectivity and to avoid cracks in molybdenum cantilever beams due to compressive forces originating in an $SiO_2$ release layer.

As noted above, the invention further relates to arrays of micromechanical electric switches. As is well-known, electrical circuit breakers are used to protect industrial and domestic electrical equipment from damage due to excessive current caused by, for example, short circuits. The damage is avoided or at least minimized by use of circuit breakers which interrupt the flow of current quickly and stop the buildup of thermal energy within a system. Most such circuit breakers are bulky electromechanical switches, and are capable of interrupting a current overload by actuation of a heavy trip mechanism when the overload current is sensed by separate control circuitry. Such breakers require a large contact closure force to be maintained in order to prevent "popping" which is a current-induced repulsive contact force proportional to the square of the current. Accordingly, these devices require substantial amounts of energy to operate since the contacts are necessarily heavy for structural stability, and are to be moved apart at a high rate of speed. Manufacturing complexities and material quantities employed are an inconvenience when these devices are required. Similar considerations apply to relays for current switching relays for control purposes in general.

In this regard, the micromechanical electric switches of the invention may be employed in the context of Hybrid Arcless Limiting Technology (HALT) which achieves arcless interruption of high currents (e.g. interruption of a 70,000 ampere peak, 480 volt, 60 hertz short circuit in less than 200 microseconds) by employing fast-opening metallic contacts for steady-state current carrying, and by rapidly transferring fault current to associated circuitry including energy-absorbing devices and solid state interrupting devices while the metallic contacts are open, such that the destructive energy of arcing is eliminated. This HALT technology is disclosed for example in Howell U.S. Pat. No. 4,700,256, entitled "Solid State Current Limiting Circuit Interrupter"; Howell U.S. Pat. No. 4,698,607, entitled "High Speed Contact Driver for Circuit Interruption Device"; Howell et al U.S. Pat. No. 4,658,227, entitled "High Speed Magnetic Contact Driver"; Howell U.S. Pat. Nos. 4,705,923, 4,717,796, 4,717,798, and 4,725,701, each entitled "Low Voltage Vacuum Circuit Interrupter" and Howell U.S. Pat. No. 4,723,187, entitled "Current Commutation Circuit" each of which is assigned to the present assignee and incorporated herein by reference.

One problem addressed by the invention is how to expeditiously machine a multiple contact switch system which has submillimeter features, high voltage isolation, and electrical resistance <100 μohm. Conventional machining is impractical because machine tools are limited to larger dimensions and are slow operating because they operate sequentially. Silicon micromachining may be considered, but has several major drawbacks. In particular, cavity depth is limited to a few microns using surface micromachining; in order to form deep cavities, silicon wafer bonding or other exotic techniques would be required. In addition, the relatively thin (e.g. approximately one micron) aluminum electrodes typically employed in the context of silicon micromachining have limited current density, and moreover are susceptible to electromigration and corrosion.

Also related to the invention is what is known as high density interconnect (HDI) technology for multi-chip module packaging, such as is disclosed in Eichelberger et al U.S. Pat. No. 4,783,695, which is incorporated herein by reference. Very briefly, in systems employing this high density interconnect structure, various components, such as semiconductor integrated circuit chips, are placed within cavities formed in a ceramic substrate. A multi-layer overcoat structure is then built up to electrically interconnect the components into an actual functioning system. To begin the multi-layer overcoat structure, a polyimide dielectric film, such as Kapton polyimide (available from E. I. Dupont de Nemours & Company, Wilmington, Del.), about 0.5 to 3 mils (12.7 to 76 microns) thick, is laminated across the top of the chips, other components and the substrate, employing Ultem® polyetherimide resin (available from General Electric Company, Pittsfield, Mass.) or another thermoplastic as an adhesive. The actual as-placed locations of the various components and contact pads thereon are determined by optical sighting, and via holes are adaptively laser drilled in the Kapton film and adhesive layers in alignment with the contact pads on the electronic components. Exemplary laser drilling techniques are disclosed in Eichelberger et al U.S. Pat. Nos. 4,714,516 and 4,894,115; and in Loughran et al U.S. Pat. No. 4,764,485, each of which is incorporated by reference. Such HDI vias are typically on the order of one to two mils (25 to 50 microns) in diameter. A metallization layer is deposited over the Kapton film layer and extends into the via holes to make electrical contact to chip contact pads. This metallization layer may be patterned to form individual conductors during the its deposition process, or it may be deposited as a continuous layer and then patterned using photoresist and etching. The photoresist is preferably exposed using a laser which is scanned relative to the substrate to provide an accurately aligned conductor pattern upon completion of the process. Exemplary techniques for patterning the metallization layer are disclosed in Wojnarowski et al U.S. Pat. Nos. 4,780,177 and 4,842,677; and in Eichelberger et al U.S. Pat. No. 4,835,704 which discloses an "Adaptive Lithography System to Provide High Density Interconnect", each of which is incorporated by reference. Any misposition of the individual electronic components and their contact pads is compensated for by an adaptive laser lithography system as disclosed in U.S. Pat. No. 4,835,704. Additional dielectric and metallization layers are provided as required in order to make all of the desired electrical connections among the chips.

As is described in detail hereinbelow, one aspect of the present invention is the reliable fabrication of moving structures employing a modified HDI technology, including use of a polymer such as a polyimide (e.g. Kapton) as a casting material.

In conjunction with the methods of the subject invention as described hereinbelow, one might consider employing $SiO_2$ to form a sacrificial layer, since this material has been successfully employed in silicon micromachining. However, such use of $SiO_2$ has revealed three problems in particular.

One problem is that cracks can develop in the $SiO_2$ sacrificial layer during thermal processing as a result of the large mismatch of the thermal expansion coefficient (TCE) for the two materials (30 ppm/°C. for polyimide, 0.5 ppm/°C. for $SiO_2$). These cracks lead to a permanent joint between the moving structure and the fixed base because metal layers on either side fuse to each other through the cracks in the. $SiO_2$ sacrificial layer.

Another problem with using a $SiO_2$ sacrificial layer is that, to maintain $SiO_2$ film integrity, thickness must be limited to one or two microns. Thus sacrificial layers must be relatively thin. Although this thickness is sufficient for silicon micromachining, it is less than the spacing of four to eight microns required between sliding surfaces in the HDI-based process of the invention employing a polymer. The need for this spacing is due to the orientation of these surfaces, which are vertical in HDI to take advantage of a polyimide film thickness of approximately fifty microns. These surfaces are rougher than planar surfaces because they are produced by laser drilling or reactive ion etching instead of film deposition. In a cylindrical configuration of the invention, achievement of sliding motion requires that the spacing be greater than the asperity height.

A third problem with a $SiO_2$ sacrificial layer is the difficulty of removing it after formation of an upper moving structure. Because the etching proceeds laterally, the etching time is impractically long in HDI-based micromachining employing a polymer where the dimensions are approximately ten times larger than in silicon micromachining. During etching, the entire structure is exposed to a corrosive solution, placing stringent requirements on the etching selectivity, i.e., the materials not intended to be etched must withstand very long etch times. In a trial with $SiO_2$, the structure required immersion in concentrated hydrofluoric acid (HF) for 16 hours to remove the low-temperature $SiO_2$ (LTO) release layer through a lateral etch distance greater than 200 microns. Such lengthy etch period would also require increased operator attention.

SUMMARY OF THE INVENTION

One object of the invention is to provide micromechanical structures and micromachining methods for fabricating micromechanical structures of piston-cylinder configuration which include a plunger element free to reciprocate within a cavity.

Another object of the invention is to provide micromachining techniques which share as many fabrication steps with HDI fabrication techniques as possible, in order to avoid a proliferation of processes.

Another object of the invention is to provide micromachining techniques which are an alternative to silicon micromachining.

Another object of the invention is to employ micromechanical switches as an alternative to traditional electrical circuit breakers and relays.

Another object of the invention is to utilize structures and fabrication techniques based on micromachining for fabricating a multiple-contact current switching system.

The invention is based on recognition that the following two principles may be employed to advantage in developing an electrical circuit breaker using micromechanical devices:

(1) If current in a main line is branched off into a network of "n" parallel lines, each carrying 1/n of the mainline current and including a pair of breaker contacts therein, then the "popping" force tending to force each apart is 1/(n*n) of the force required with only one pair of contacts in the main line because the popping force is proportional to the square of the current; hence, the total force required to avoid "popping" for "n" such contacts is only 1/n of the net force required for only one pair of contacts carrying the total current.

(2) If a pair of contacts is to be opened by a gap "D" in a time "t", then it is just as acceptable to have "k" gaps in series, each equal in size to 1/k times "D", synchronously opening.

The above two principles are further discussed in the above-incorporated application Ser. No. 08/000,313.

The micromechanical devices of the invention are minuscule, and a large number, for example a thousand, can be incorporated within the space of a single multichip module (MCM). The resulting device is extremely compact, lightweight, and relatively simple to manufacture. A bank of such micromechanical switches may be suitably connected as either a parallel array or a series-parallel array.

As will be apparent, the invention cost effectively achieves a multiple contact switch system which includes submillimeter features, high voltage isolation, and electrical resistance less than 100 μohm.

In accordance with a more particular aspect of the invention, a micromachining method for fabricating a micromechanical structure includes use of a plunger element free to reciprocate within a cavity. Initially, a base having a generally planar surface is provided, and a layer of polymer material is then applied over the base. A well-like cavity is formed in the polymer layer, extending at least partially through the polymer layer, by employing laser ablation.

A lining sacrificial layer is conformally deposited within the cavity and over the layer of polymer material. The sacrificial layer is patterned and etched to provide upper layer attachment points, and then an upper layer is conformally formed over the lining sacrificial layer, a portion of the upper layer within the cavity comprising the plunger element.

Preferably, in order to provide greater sacrificial layer thickness above the layer of polymer material compared to the sacrificial layer thickness within the cavity, an initial sacrificial layer is deposited over the layer of polymer material prior to the step of forming a well-like cavity in the polymer layer. When laser ablation is employed to form the well-like cavity, the initial sacrificial layer functions as a mask by allowing formation of an opening in the initial sacrificial layer, defining the cavity location.

In some embodiments of the invention, the lining and initial sacrificial layers are comprised of metal, such as copper, formed by copper electroplating. As an alternative, the lining and initial sacrificial layers may comprise an organic material which is selectively removable in the presence of Kapton polyimide. An example is polymethylmethacrylate (PMMA).

The structure is completed by attaching an actuator to the upper layer, such as an electromagnetic actuator, and releasing the upper layer and actuator for axial movement within the cavity relative to the layer of polymer material by employing a selective etch to remove the lining and initial sacrificial layers. The actuator may be attached to the upper layer either before or after the selective etch which removes the lining and initial sacrificial layers.

A corresponding micromechanical structure in accordance with the invention includes a base having a generally planar surface, and a cavity-supporting layer of polymer material over the base. The structure includes at least one well-like cavity in the cavity-supporting polymer layer extending at least partially through the cavity-supporting polymer layer. At least one plunger-like element generally conforming to the shape of the well-like cavity is axially movable within the cavity, the plunger-like element comprising a portion of an upper layer. Finally, an actuator, which preferably comprises a ferromagnetic element, is attached to the upper layer.

In accordance with another more particular aspect of the invention, a micromachining method for fabricating a micromechanical electric switch employs an initial step of providing an electrically-insulative base having a generally planar surface. In one embodiment, the base is provided by applying a base polymer dielectric layer to a substrate, such as a ceramic substrate.

Next, a patterned first conductive layer is formed on the base, with portions thereof comprising stationary switch contacts. Preferably, the patterned first conductive layer comprises gold. A cavity-supporting polymer dielectric layer is then applied over the base and over the patterned first conductive layer thereon, and the stationary switch contacts are exposed by forming at least one well-like cavity extending through the cavity-supporting polymer dielectric layer. The well-like cavity is preferably formed by laser ablation.

A lining sacrificial layer is thereafter conformally deposited within the cavity and over the cavity-supporting polymer dielectric layer. A second conductive layer is then conformally formed over the lining sacrificial layer, with at least one portion of the second conductive layer within the cavity to serve as a movable switch contact.

In order to provide greater sacrificial layer thickness above the cavity-supporting polymer dielectric layer compared to sacrificial layer thickness within the cavity, an initial sacrificial layer is deposited over the cavity-supporting polymer dielectric layer prior to the step of exposing the stationary switch contacts. Advantageously, this initial sacrificial layer is employed as a mask for the laser ablation process which forms the cavity or cavities in the cavity-supporting polymer dielectric layer. Thus at least one opening is formed in the initial sacrificial layer to define the location of the cavity, and a laser is employed to ablate the cavity-supporting polymer dielectric layer where not masked.

The lining sacrificial layer and the initial sacrificial layer may comprise metal, preferably layers of electroplated copper. Alternatively, sacrificial layers of organic material may be employed.

Alternative contact arrangements may be employed. In one embodiment, a cavity is formed at a location where two stationary switch contacts are exposed at the bottom of a single cavity such that the two stationary switch contacts can be electrically bridged by a single movable switch contact. As an alternative, two cavities are formed at locations where a single stationary contact is exposed at the bottom of each cavity such that the two stationary contacts can be electrically connected through respective movable switch contacts comprising portions of the second conductive layer. Preferably, a plurality of micromechanical electric switches are simultaneously fabricated on a common base.

An actuator, such as an electromagnetic actuator, is attached to the second conductive layer, and the second conductive layer and actuator are released for axial movement of the movable switch contact or contacts within the cavity or cavities relative to the cavity-supporting polymer dielectric layer by employing a selective etch to remove the lining sacrificial layer. The actuator may be attached to the second conductive layer either before or after the selective etch.

A corresponding micromechanical electric switch structure includes an electrically-insulative base having a generally planar surface, and a patterned first conductive layer on the base comprising at least a pair of stationary switch contacts, and preferably a plurality of pairs of stationary switch contacts on a common base.

The micromechanical electric switch includes a cavity-supporting polymer dielectric layer over the base and over the patterned first conductive layer, and a cavity or cavities in the cavity-supporting polymer dielectric layer exposing the stationary switch contacts. At least one plunger-like movable switch contact generally conforms to the shape of the cavity or cavities and is axially movable within the cavity or cavities, the plunger-like movable switch contact or contacts comprising a portion of a second conductive layer. An actuator, such as a ferromagnetic element, is attached to the second conductive layer.

Thus, in accordance with the invention, multi-chip module fabrication technology such as the HDI technology is combined with a micromachining process for making moving parts. Significant aspects of the invention include employing a polymer material such as a polyimide as the micromachinable material, in layers 25 microns thick or thicker. Vertical dimensions greater than 50 microns may be achieved. Cavities are formed in the polymer material by direct laser patterning. Electroplated copper employed as the sacrificial release layer provides conformal coverage of the sacrificial layer over steep contact well edges, adequate spacing between movable and fixed structures to reduce friction, and an absence of release layer cracks. In addition, as described hereinbelow, support springs are fabricated as an integral part of the structure.

In the specific context of providing an ultrafast current interruption system configured as a multiple contact array, the invention achieves a number of objectives, including: conductors with high electrical conductivity, high current density and excellent wear-out and oxidation resistance characteristics; large motion excursion as required for electrical isolation of the electrodes after current interruption; electromigration resistance of the conductors at high current density; temperature excursions within the nondestructive range of the materials used; current interruption faster than 100 microseconds; electromagnetic actuation mechanism; and low-cost reliable manufacturing using micromachining. When combined with the Hybrid Arcless Limiting Technology (HALT) referred to hereinabove, the contact structures of the invention are capable of interrupting substantial short circuit currents.

In the specific context of providing a sacrificial layer suitable for HDI-compatible processes for fabricating micromechanical structures, the invention achieves a number of objectives, including: conformal coating of deep straight walls; low temperature processing; low intrinsic stresses; high thermal conductivity for dissipation of resistively generated heat through the base; close matching of thermal expansion coefficient with other HDI materials; avoidance of crack formation; thickness of few micrometers without losing film integrity; high film deposition rate; low-cost deposition apparatus such as is used in HDI processing; high lateral etch rate; and high etch selectivity with respect to other exposed HDI material surfaces.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description, taken in conjunction with the drawings, in which:

DETAILED DESCRIPTION

Figure 1:
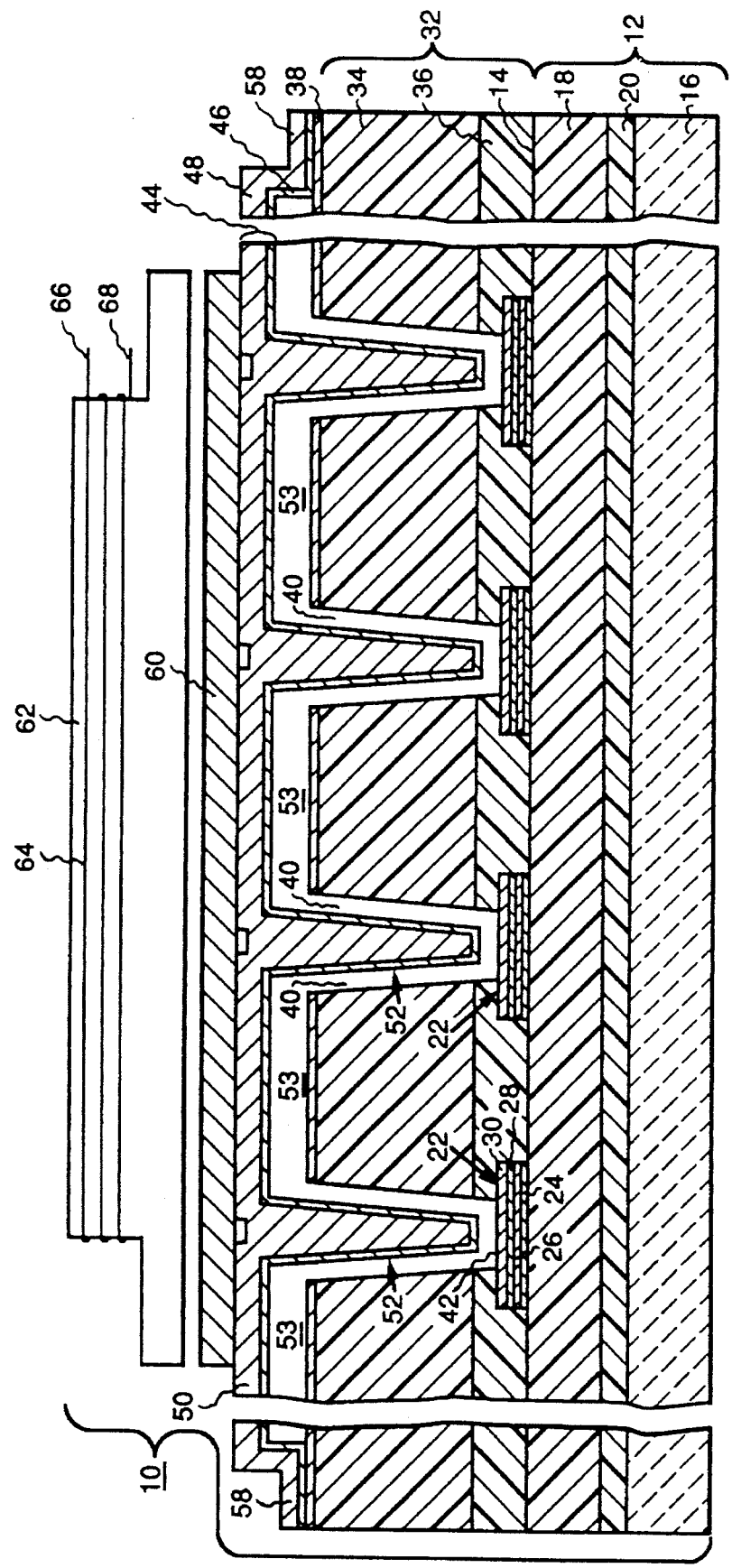
FIG. 1 is a cross-sectional view of a micromechanical electric switch structure in accordance with one embodiment of the invention.

FIG. 1 illustrates a micromechanical electric switch structure 10 including an electrically insulative base 12 having a generally planar surface 14. To provide mechanical support for the rest of the structure, base 12 includes a ceramic substrate 16 which typically is about 0.050 inches in thickness, and can be comprised of any one of various ceramic materials having high thermal conductivity, high mechanical stiffness, and a thermal expansion coefficient compatible with that of an adjacent polymer layer. Ceramic materials which may be employed include aluminum nitride (AlN), aluminum oxide ($Al_2O_3$), silicon carbide (SiC), and composites of these materials.

Preferably, in order to provide dielectric isolation, a smooth planar surface, and reduced mechanical stress near the subsequently-applied electrodes, base 12 additionally includes a relatively thick layer 18 of polyimide, also referred to herein as a base polymer dielectric layer 18, such as Kapton polyimide, laminated over ceramic substrate 16 employing a layer 20 of thermoplastic material such as Ultem 1000 polyetherimide resin as an adhesive. Kapton polymer layer 18 is typically about 25 microns thick, and Ultem adhesive layer 20 is approximately 12 microns thick.

Figure 2:
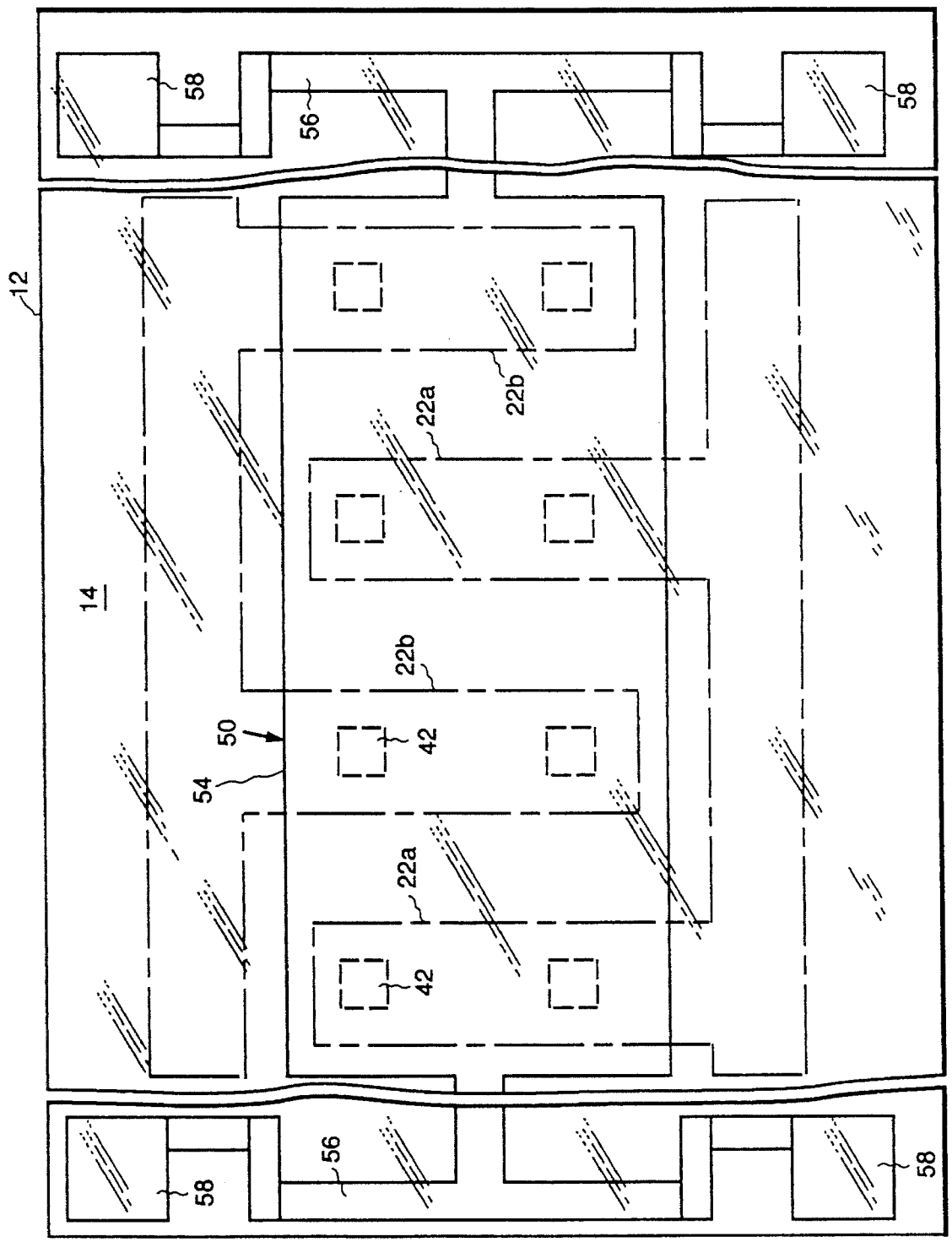
FIG. 2 is a highly schematic plan view of the FIG. 1 micromechanical electric switch structure.

Formed on base 12 is a patterned first conductive layer comprising at least one pair and preferably a larger plurality, of stationary switch contacts 22. Referring additionally to FIG. 2, electrodes 22 comprise a pair of interdigitated switch contact structures 22a and 22b.

Electrodes 22 are preferably comprised of multiple layers, such as a thin layer 24 of sputtered titanium, about 1000 Å thick, to increase the adhesion of copper to the underlying Kapton layer 18, a relatively thick layer 26 of copper formed by initially sputtering onto layer 24 a copper film of approximately 3000 Å thickness and subsequently electroplating thereon a copper layer of about four microns thickness to provide the main path for electrical conduction, a relatively thin layer 28 of nickel, about 1000 Å thick, electroplated onto copper layer 26 to provide a diffusion barrier between copper and gold, and finally a relatively thick layer 30 of gold, about two microns thick, electroplated onto nickel layer 28 for preventing copper oxidation at the contacts and thereby maintaining a low contact resistance over time. In the fabrication method described hereinbelow with reference to FIGS. 3A through 3G, gold layer 30 also functions as an etch-stop to allow selective removal of a copper sacrificial layer without damage to switch contacts 22.

Formed over base 12 and the patterned first conductive layer 22 is a cavity-supporting polymer dielectric layer 32 comprising a relatively thick layer 34 of Kapton polyimide, about fifty microns thick, laminated with a SPI/epoxy adhesive layer 36 onto base 12 and the patterned first conductive layer comprising stationary contacts 22. Directly on Kapton layer 34 is a titanium layer 38 which increases adhesion of a subsequently-described outer conductive layer to Kapton layer 34.

Formed in cavity-supporting polymer dielectric layer 32 are a plurality of well-like cavities 40 exposing the underlying stationary switch contacts 22 and defining switch contact sites 42, which may also be seen in the schematic plan view of FIG. 2.

The structure depicted in FIGS. 1 and 2 is a very small portion of an extensive array of switches that may comprise as many as one thousand contacts per overall switch structure. Moreover, as will be apparent from the description hereinbelow with reference to FIG. 5, alternative positionings of well-like cavities 40 with respect to stationary switch contacts 22 are possible. In particular, in the contact configuration shown in FIGS. 1 and 2, a single stationary contact 22 is exposed at the bottom of each cavity, while in the contact configuration shown in FIG. 5 the cavities are positioned such that two stationary switch contacts are exposed at the bottom of each cavity.

Generally overlying cavity-supporting polymer dielectric layer 32 is a second or outer conductive layer 44, comprised of two sublayers, a relatively thin sublayer 46 of sputtered gold, about 1000 Å thick, and a relatively thicker sublayer 48 of electroplated gold, about eight microns thick. Outer conductive layer 44 comprises a plate portion 50, and additionally comprises plunger-like movable switch contacts 52 which generally conform to the shapes of cavities 40, and are axially movable therein. Outer conductive layer 44 is generally separated from cavity-supporting polymer dielectric layer 32 and its adhesion-increasing titanium layer 38, the inner walls of cavities 40 and stationary switch contacts 22, by a gas-filled gap 53.

As best seen in FIG. 2, plate 50 is patterned into a movable common slab portion 54, leaf spring support portions 56, and anchor portions 58. The particular arrangement shown in FIG. 2 is exemplary only, as any of a variety of particular patterns may be employed in order to achieve what is in effect, an integral support spring structure. Despite the use of leaf spring support portions 56, spring force alone, in the conventional sense, is not employed to hold the moving structure in any particular position; rather, a separate actuator structure is employed and support springs 56 primarily serve as a resilient mounting and retaining mechanism.

In FIG. 1, an actuator 60 shown attached to common slab portion 54 (FIG. 2) of second conductive layer 44 comprises a ferromagnetic element, in particular a permanent magnet. Cooperating with ferromagnetic actuator 60 is an electromagnet 62 including a coil 64 having terminals 66 and 68. When high speed switch operation is required, a relatively large electromagnet 62 may be employed external to a package (not shown) containing actuator 60 and other elements of switch structure 10.

In operation, when electromagnet 62 is energized with current of one polarity, the moving structure comprising common slab portion 54 of top plate 50 and switch contacts 52 is drawn upwardly by magnetic attraction, and the individual contacts are all open, which is the condition depicted in FIG. 1. Conversely, when electromagnet 62 is energized with current of the opposite polarity, magnetic repulsion between electromagnet 62 and ferromagnetic actuator 60 causes the entire moving structure to be driven downwardly, whereupon the plunger-like movable switch contacts 52 are in electrical contact with their respective stationary switch contacts 22. The interdigitated stationary switch contacts 22a and 22b of FIG. 2 are thus electrically connected through their respective movable switch contacts 52 comprising portions of second conductive layer 44. Actuator 60, which is common to all of contact sites 42, ensures that all contacts open at essentially the same time; otherwise, a "lingering" contact could lead to rapid failure due to momentary concentration of current.

Switch structure 10 may have as many as 1000 contact sites per structure and a continuous current-carrying capability of 100 amperes. Although each individual contact site can in theory carry several amperes, difficulty in achieving even current distribution among the individual contact sites is a practical limitation. In essence, current is carried through a thin conductive film with a small cross section. The voltage capability depends on the contact separation gap, and is in the range of 250 volts to 600 volts for a 25 micron contact spacing. The particular switches illustrated and described herein are intended to switch 270 volts DC. For higher voltages, the individual switch contact sites can be organized into a series/parallel array, as referred to hereinabove.

It will be appreciated that the switch structure of the present invention may be employed as an ordinary control relay, or as a current interrupting circuit breaker. Destruction of the switch contacts by arcing is avoided by employing, in combination, technology such as the Hybrid Arcless Limiting Technology (HALT) identified hereinabove.

Figure 3A:
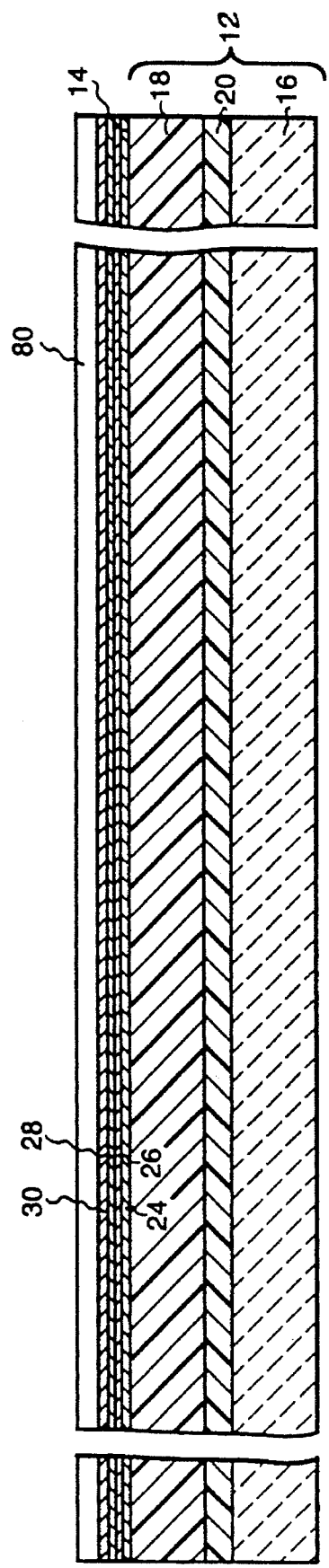
FIGS. 3A through 3H depict, in cross-sectional views, steps in a method for fabricating the switch structure of FIGS. 1 and 2.
Figure 3B:
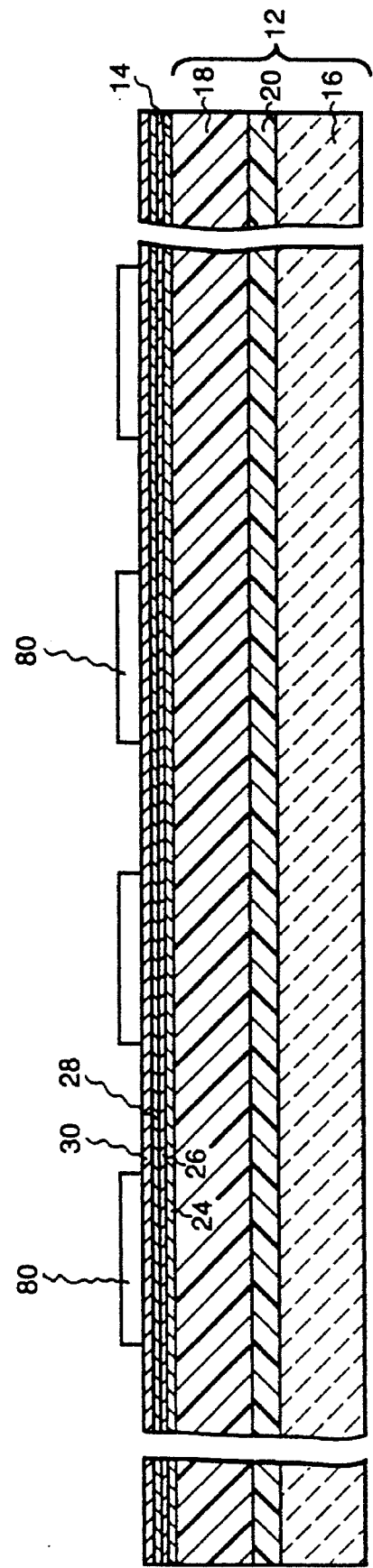

FIG. 3A shows the initial stages in fabricating the structure of FIGS. 1 and 2, beginning with lamination of Kapton Polyimide layer 18 over ceramic substrate 16 at a temperature of 300° C. by employing a press (not shown), with layer 20 of Ultem 1000 resin serving as a thermoplastic adhesive material. The resultant base 12 thus provides dielectric isolation and a smooth planar surface 14 for reduced mechanical stress near stationary electrodes 22.

Figure 3C:
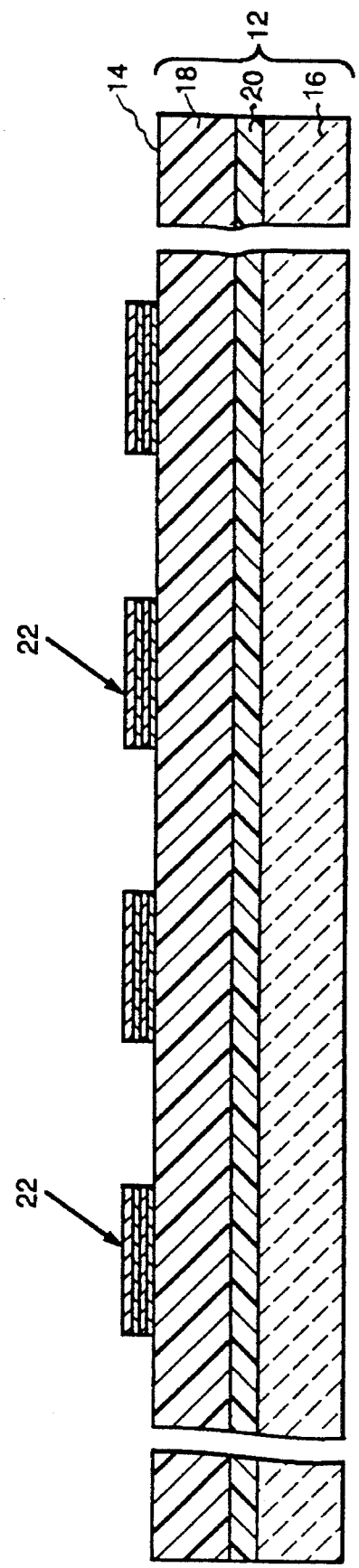

Stationary electrodes 22 are formed by successive deposition of multiple layers, followed by patterning. The layers in unpatterned form are shown in FIG. 3A, and electrodes 22 after patterning are shown in FIG. 3C.

More particularly, thin layer 24 of titanium or TiW (10% Ti, 90% W), shown in FIG. 3A, is formed by sputtering the layer to a thickness of about 1000 Å to facilitate copper electroplating and to increase adhesion to the underlying Kapton layer 18. The relatively thicker layer 26 of copper is formed on layer 24 by sputtering a copper film to a thickness of about 3000 Å and then electroplating thereon a copper layer to a thickness of about four microns to provide the main electrically conductive path. Thin layer 28 of nickel is next deposited on layer 26 to a thickness of about 1000 Å by electroless plating to provide a diffusion barrier between copper and gold. Finally, layer 30 of gold is electroplated on nickel layer 28 to prevent copper oxidation and thereby ensure maintenance of low contact resistance over time.

To pattern this multi-layer structure to form actual contacts 22, a layer of photoresist 80 is deposited, by either spinning or spraying. By way of example, Fanton is a suitable negative photoresist. Employing a computer-controlled argon-ion laser, photoresist 80 is hardened over the electrode 22 positions, and the remaining resist is dissolved using a developer, resulting in patterned photoresist regions 80 on the structure of FIG. 3B.

Etching then follows, initially in a KI solution to remove the exposed portions of gold layer 30, followed by an $FeCl_3$ solution to remove exposed portions of nickel layer 28 and copper layer 26, and then in an aqueous HF solution (conc. $HF:H_2O=1:30$ by volume) to remove unmasked portions of titanium or $H_2O_2$ to remove TiW layer 24.

Patterned photoresist regions 80 are then removed by wet stripping, leaving the structure as shown in FIG. 3C which, as noted above, is an interdigitated pattern of coplanar electrodes, shown in FIG. 2 as electrodes 22a and 22b.

Figure 3D:
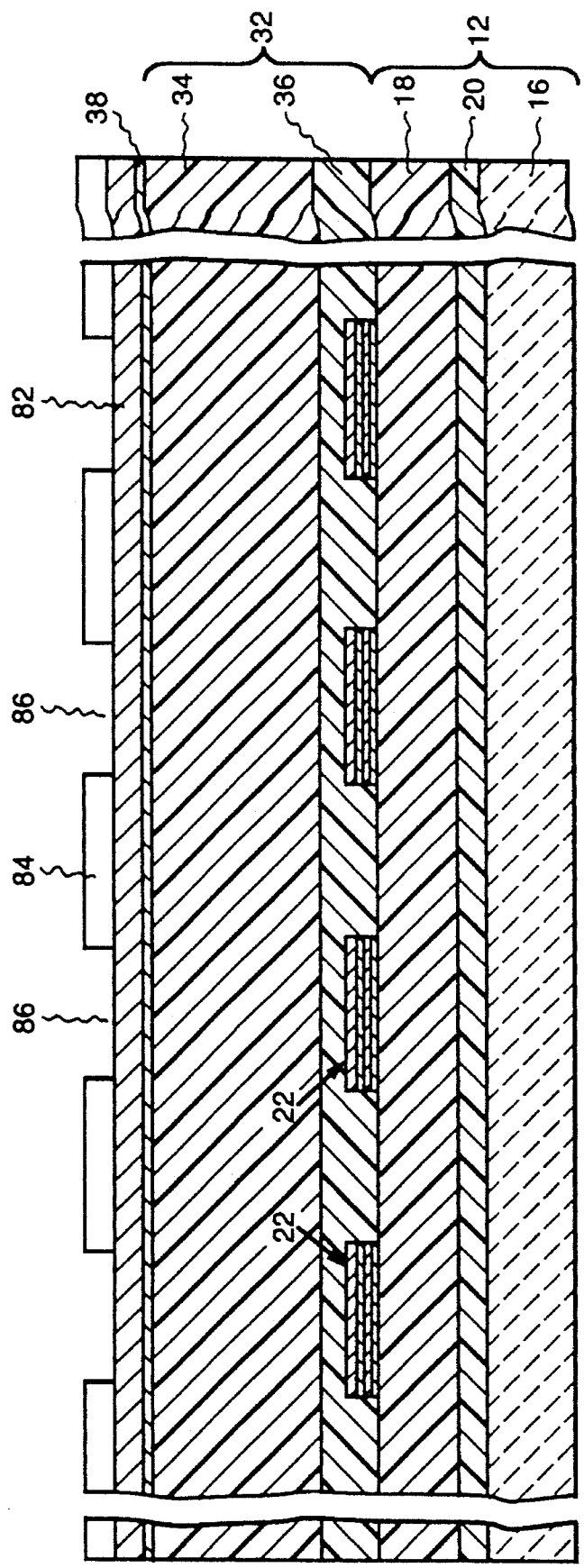

Cavity-supporting polymer dielectric layer 32, as shown in FIG. 3D, is next formed by laminating about a fifty micron thick Kapton layer 34 over base structure 12, employing SPI/epoxy layer 36 as an adhesive layer.

Kapton layer 34 is overlaid by layer 38 of sputtered titanium, followed by an initial sacrificial layer 82 preferably comprising sputtered copper to a thickness of about 3000 Å, overlaid by electroplated copper for a total layer 82 thickness of approximately four microns.

Metal layers 38 and 82 serve several functions. Briefly, initial sacrificial layer 82 of copper ensures that initial mechanical contact occurs at the bottoms of well-like cavities 40 (FIG. 1) when the switch contacts are closed. Additionally, metal layers 38 and 82 function as a mask during laser ablation of cavity-supporting polymer layer 32 comprising the Kapton polyimide layer 34 and SPI/epoxy adhesive layer 36.

To this end, another layer of photoresist, such as Fanton photoresist, is deposited over the initial sacrificial layer 82 of copper by either spinning or spraying techniques, patterned with a computer-controlled laser, such as an argon-ion laser, and developed, to provide remaining regions 84 of photoresist defining openings 86 which outline the contact locations. In the embodiment of FIGS. 1, 2 and 3A–3H, openings 86 are located directly over stationary contacts 22.

Etching again follows, first in an $FeCl_3$ solution to remove the exposed portions of copper layer 82 not protected by photoresist regions 84, and then in an aqueous HF solution (conc. $HF:H_2O=1:30$ by volume) to remove the exposed portions of titanium layer 38. Photoresist regions 84 are then stripped, resulting in the structure of FIG. 3E, wherein the remaining portions of initial sacrificial layer 82 which define openings 88 function as a mask for subsequent formation of the well-like cavities exposing contacts 22.

Figure 3E:
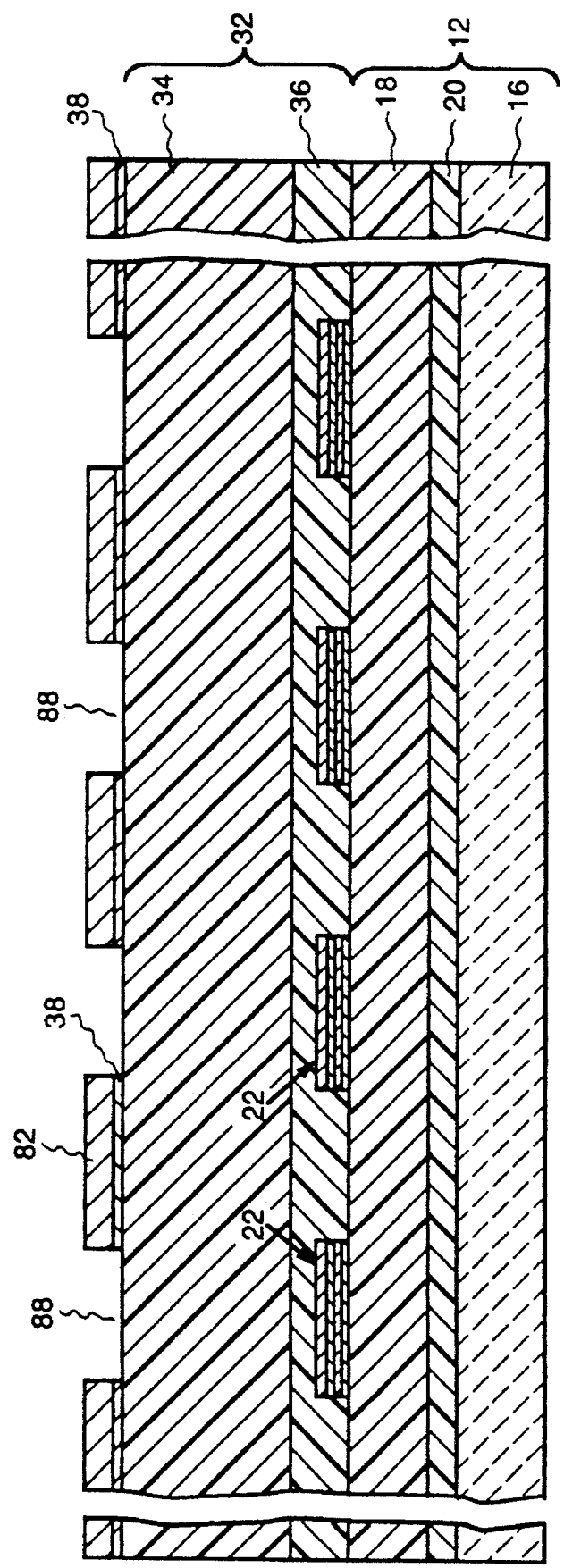
Figure 3F:
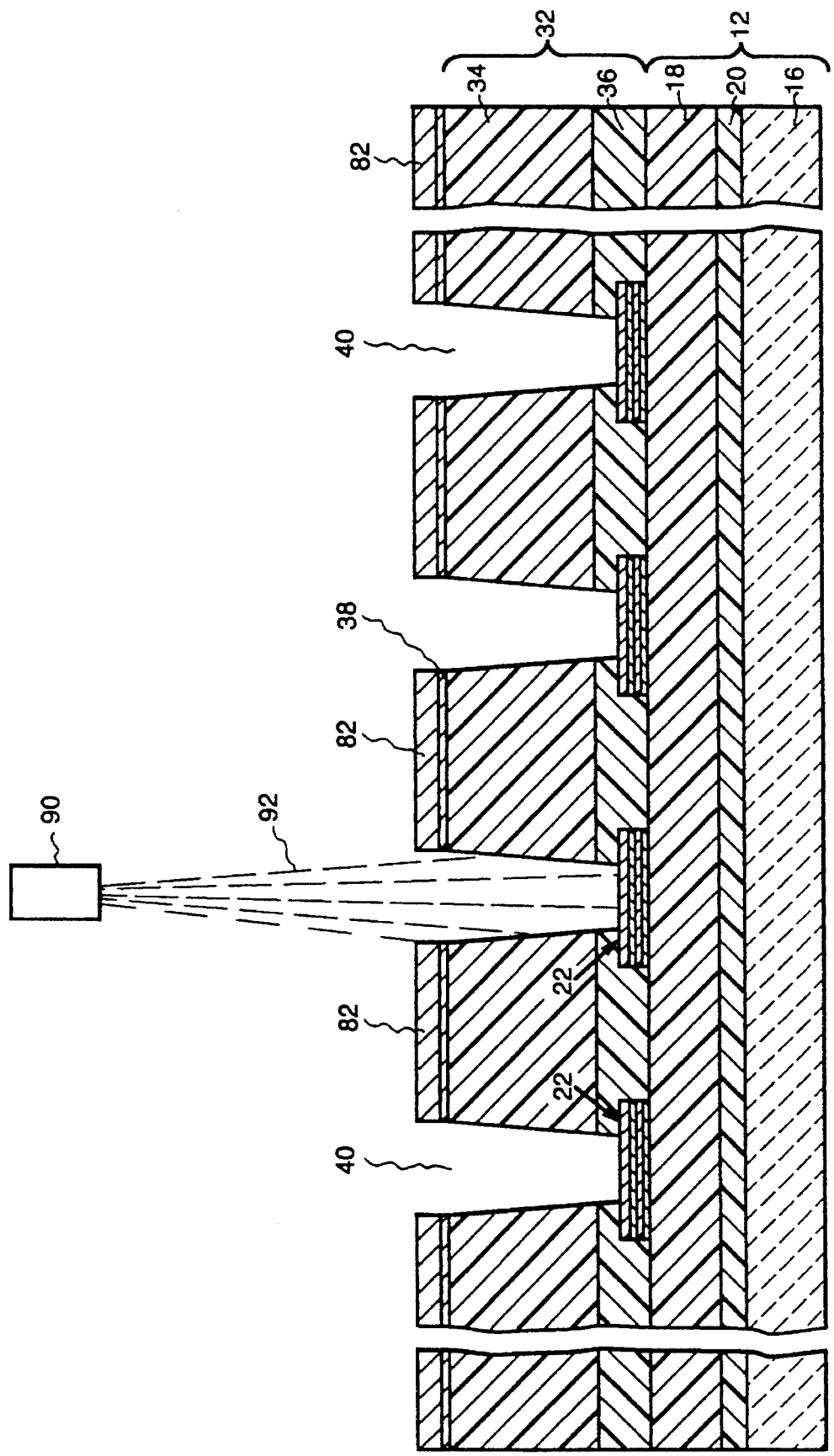

As shown in FIG. 3F, Kapton layer 34 and SPI/epoxy layer 36 are ablated employing a XeCl excimer laser 90. The beam 92 of laser 90 is relatively wide, and is directed in a raster scan pattern over the entire working area, in contrast to laser dithering as described, for example, in the above-identified U.S. Pat. No. 4,894,115. The result is formation of well-like cavities 40 having relatively smooth sidewalls. Each of cavities 40 may have a footprint that is for example, square, rectangular or round, with a typical area of about four mils square, and formed in a layer of Kapton. Alternatively, well-like cavities 40 may be formed by other processes, such as reactive ion etching.

Figure 3G:
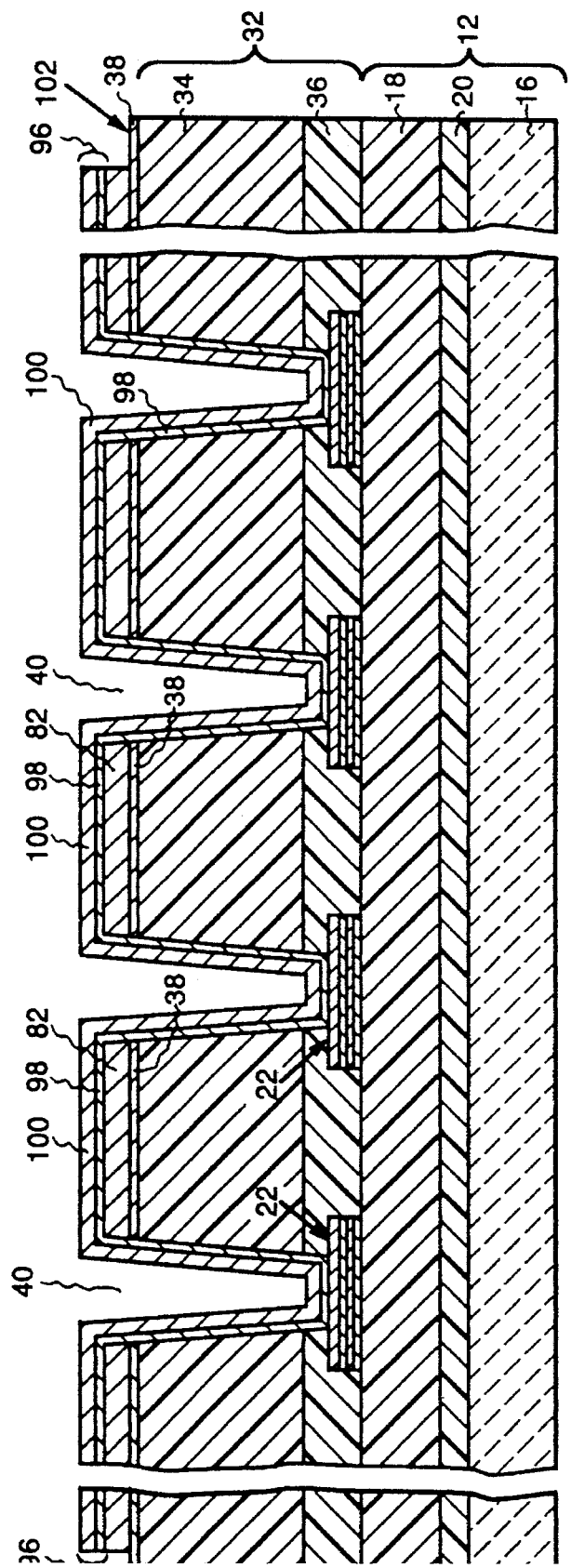

Next, as depicted in FIG. 3G, a lining sacrificial layer 96 is deposited within cavities 40 and over cavity-supporting polymer dielectric layer 32. More particularly, lining sacrificial layer 96 is formed by initially sputtering a thin copper sublayer 98 of approximately 4000 Å thickness for starting the electroplating process. Lining sacrificial layer 96 is then completed by electroplating a sublayer 100 of copper, approximately eight microns thick, over sublayer 98.

The thickness of that portion of lining sacrificial layer 96 within cavities 40 defines the ultimate spacing between movable switch contacts 52 and the cavity 40 sidewalls, as shown in FIG. 1. Electroplated copper as the lining sacrificial layer 98 provides conformal coverage over steep sidewalls of cavities 40, and can be formed to a thickness of four to eight microns so that spacing exceeds asperity height.

Figure 3H:
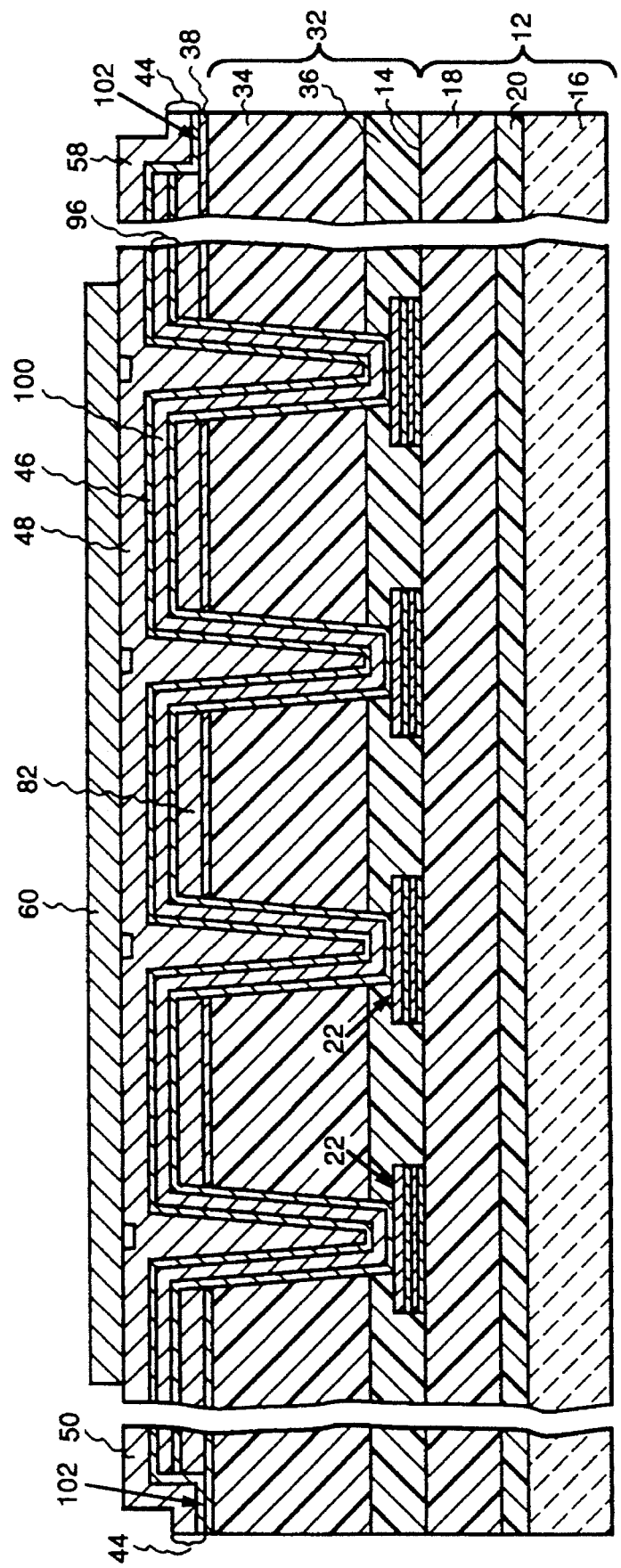

Lining sacrificial layer 96 comprising sublayers 98 and 100 is then patterned employing a photoresist (not shown) and a selective etch to leave anchor pads 102 where portions of titanium layer 38 are exposed for subsequent attachment of plate 50 anchor portions 58, shown in FIG. 3H.

The second or outer conductive layer 44 is then formed, as may be seen in FIG. 3H, directly over lining sacrificial layer 96. While outer conductive layer 44 is formed primarily by electroplating, the initial layer 46 of gold is applied by sputtering to a thickness of approximately 1000 Å to provide a nucleation base, followed by the approximately eight micron thickness electroplated gold layer 48, which together comprise outer conductive layer 44. Outer conductive layer 44 is spaced from the underlying structure by initial sacrificial layer 82 and lining sacrificial layer 96, at all areas except the anchor pads 102 where anchor portions 58 (see also FIG. 2) are attached.

Either at this juncture, or during a subsequent stage, ferromagnetic actuator 60 is attached to gold layer 48, as indicated in FIG. 3H, by use of epoxy glue (not shown).

In order to release upper conductive layer 44 comprising plate 50 and actuator 60 for axial movement of movable switch contacts 52 within cavities 40, the initial and lining sacrificial layers 82 and 96 are replaced by the gas-filled gap, e.g. air gap, 53 (shown in FIG. 1) by employing a selective etch to remove sacrificial layers 82 and 96 to arrive at the structure depicted in FIG. 1. More particularly, a selective etch such as $FeCl_3$ is employed which dissolves copper, but does not dissolve gold.

Figure 4:
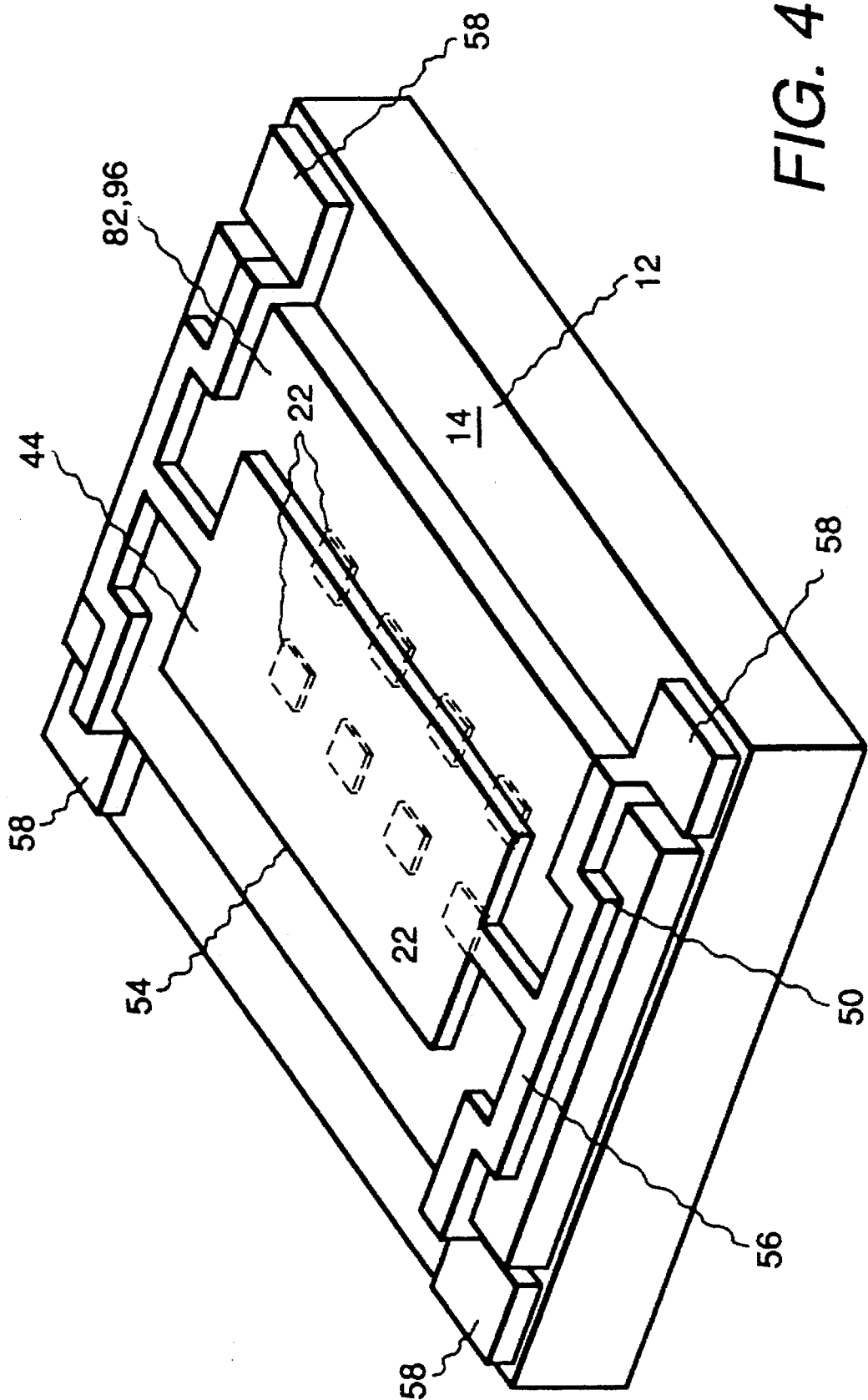
FIG. 4 conceptually depicts, in perspective view, the manner in which the top plate of the invention is fabricated, and generally corresponds to FIG. 3H.

FIG. 4, which may be compared to FIG. 3H, conceptually illustrates the plate 44 attachment, prior to selective etch to remove sacrificial layers 82 and 96.

Although the structure and method of FIGS. 1–4 has been described with reference to the fabrication of a micromechanical electric switch, the invention is not so limited, and may be employed in any situation where it is desired to form a microstructure comprising a piston in a cylinder. As one example, the method and structure may be employed to implement a fluid valve.

Figure 5:
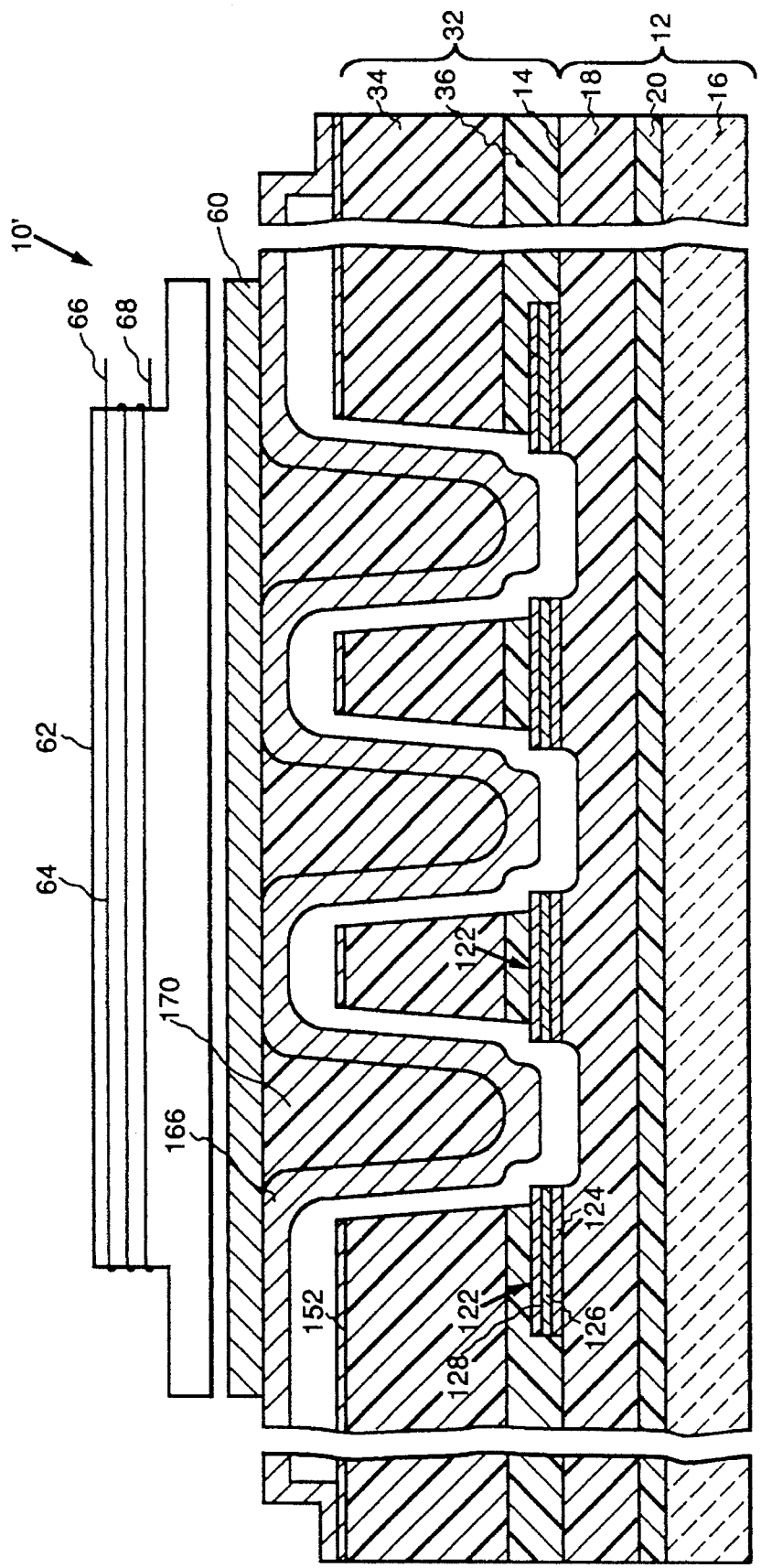
FIG. 5 is a cross-sectional view, similar to that of FIG. 1, of another micromechanical electric switch structure in accordance with the invention.

FIG. 5 depicts an alternative structure to that of FIGS. 1 and 2, while FIGS. 6A through 6F depict method steps for forming the FIG. 5 structure.

In FIG. 5, structure 10' differs from that of FIGS. 1 and 2 primarily in that two stationary switch contacts 122 are exposed at the bottom of a single cavity, allowing the two stationary switch contacts to be electrically bridged by a single movable switch contact. It will be appreciated that this difference primarily reflects the relative positioning of the cavities with reference to stationary contacts 122. However, there are other differences related to the choice of materials for contacts 122.

The method shown in FIGS. 6A through 6F for fabricating switch structure 10' of FIG. 5 is similar to the method of FIGS. 3A through 3H. As alternatives to copper sacrificial or release layers, other metals such as molybdenum or aluminum may be employed, as well as organic materials such as polymethylmethacrylate (PMMA). (Such alternative sacrificial layer materials may also be employed in the method of fabricating the structure of FIGS. 1 and 2).

When fabricating the FIG. 5 structure, the contact pad 122 material is selected in view of the material employed for the sacrificial or release layers, and particularly in view of the selective etch employed. The requirements in this regard are more severe than for the FIGS. 1 and 2 structure because, as will become apparent when considering the fabrication process, portions of all the sublayers of contact pads 122 are exposed to the selective etch, not just the outermost layer 30 as in the FIGS. 1 and 2 structure. Accordingly if, for example, copper sacrificial layers are employed, no sublayers of contact pads 122 can be comprised of copper since even an intermediate copper sublayer would be laterally attacked by the selective etch for copper.

Figure 6A:
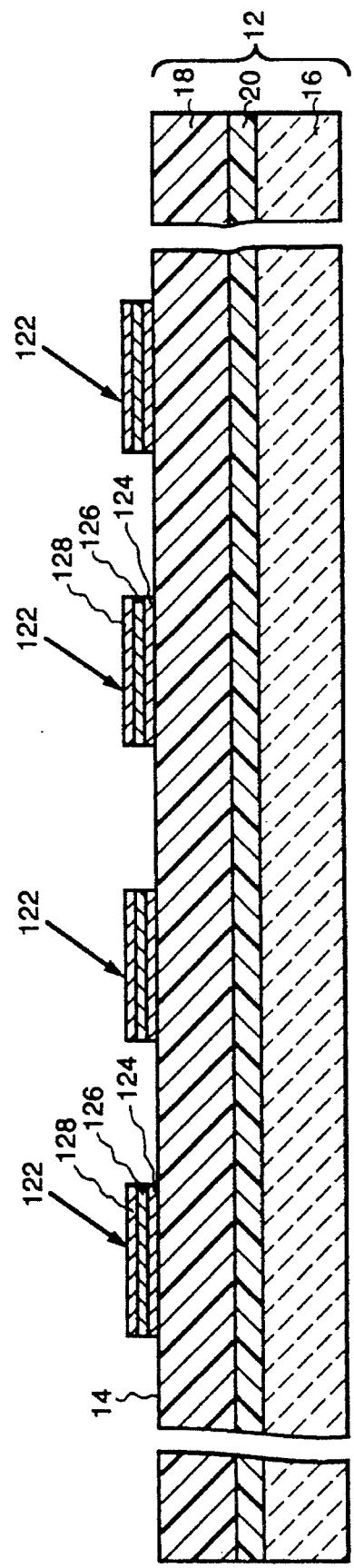
FIGS. 6A through 6F depict, in cross-sectional views, steps in a method of fabricating the switch structure of FIG. 5.

The initial part of the fabrication process of FIGS. 6A through 6F is essentially identical to that which is described hereinabove with reference to FIGS. 3A through 3H, except for the metal used for the stationary contacts. Thus layer 18 of Kapton polyimide is laminated over ceramic substrate 16 at a temperature of about 300° C. employing a press (not shown), with Ultem 1000 resin layer 20 serving as a thermoplastic adhesive, such that the resultant base 12 has a smooth planar surface 14. Stationary electrodes 122 are formed by successive deposition and patterning. The resulting intermediate structure of FIG. 6A is comparable to the intermediate structure of FIG. 3C described hereinabove. However, if a copper sacrificial layer is to be subsequently employed, copper must be excluded from each layer of contacts 122, since even a gold-plated outermost surface will not protect a copper-containing contact 122 from lateral attack by etchant. As an example of an operable construction, contacts 122 may comprise an initial layer 124 of TiW (10% Ti, 90% W) supporting a 1000 Å thickness layer 126 of sputtered gold, which in turn is electroplated with a two-micron thickness gold layer 128.

Figure 6B:
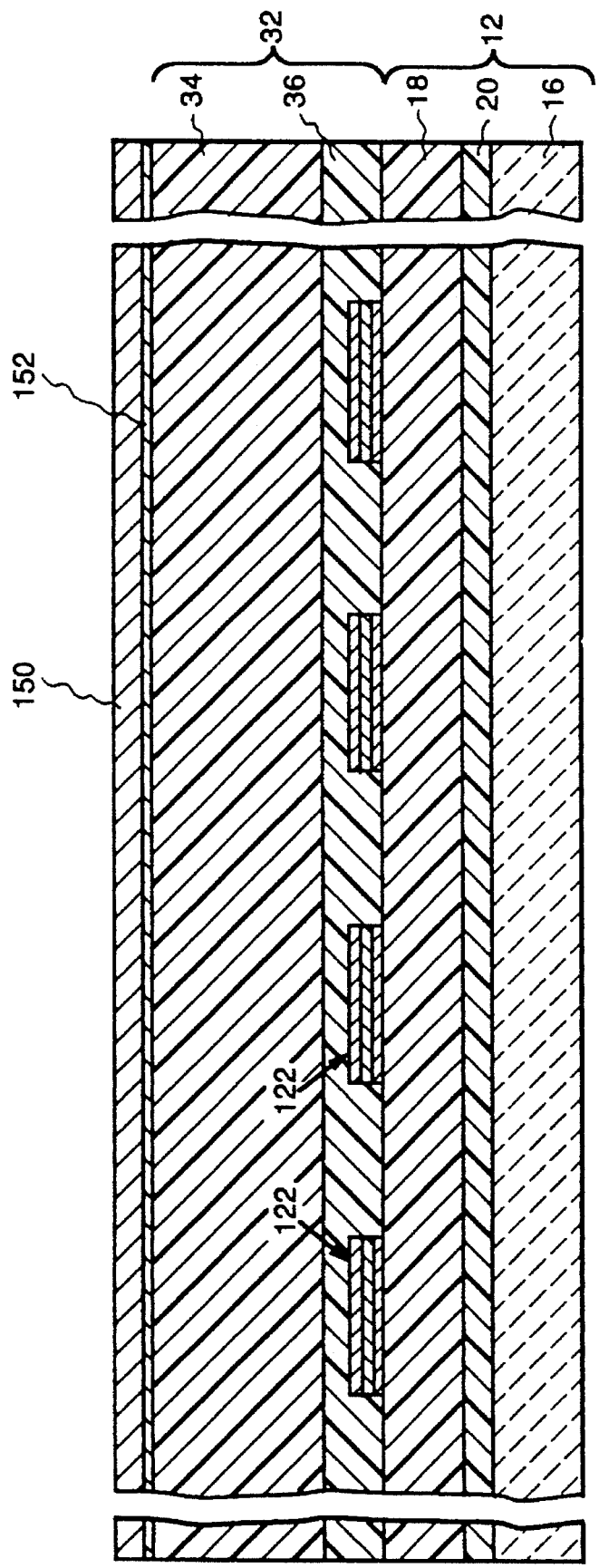

As shown in FIG. 6B, the cavity-supporting polymer dielectric layer 32 is formed by laminating Kapton layer 34 of about fifty microns thickness over base structure 12, with SPI/epoxy layer 36 serving as an adhesive layer. An initial sacrificial layer 150, comprising a material or materials which can be quickly removed by lateral etching without damaging layers above and below, is applied to Kapton layer 34. As in the case of the initial sacrificial layer 82 of FIG. 3C, the initial sacrificial layer 150 may comprise sputtered copper, overlaid by electroplated copper, for example. As shown in FIG. 6B, copper layer 150 is situated on a sputtered titanium layer 152.

As an alternative to copper, either molybdenum or aluminum can be used as the sacrificial layers, since these materials can be selectively removed at a relatively high lateral etch rate without damaging exposed copper surfaces on either side. In such instance, copper can be employed in stationary contacts 122.

Figure 6C:
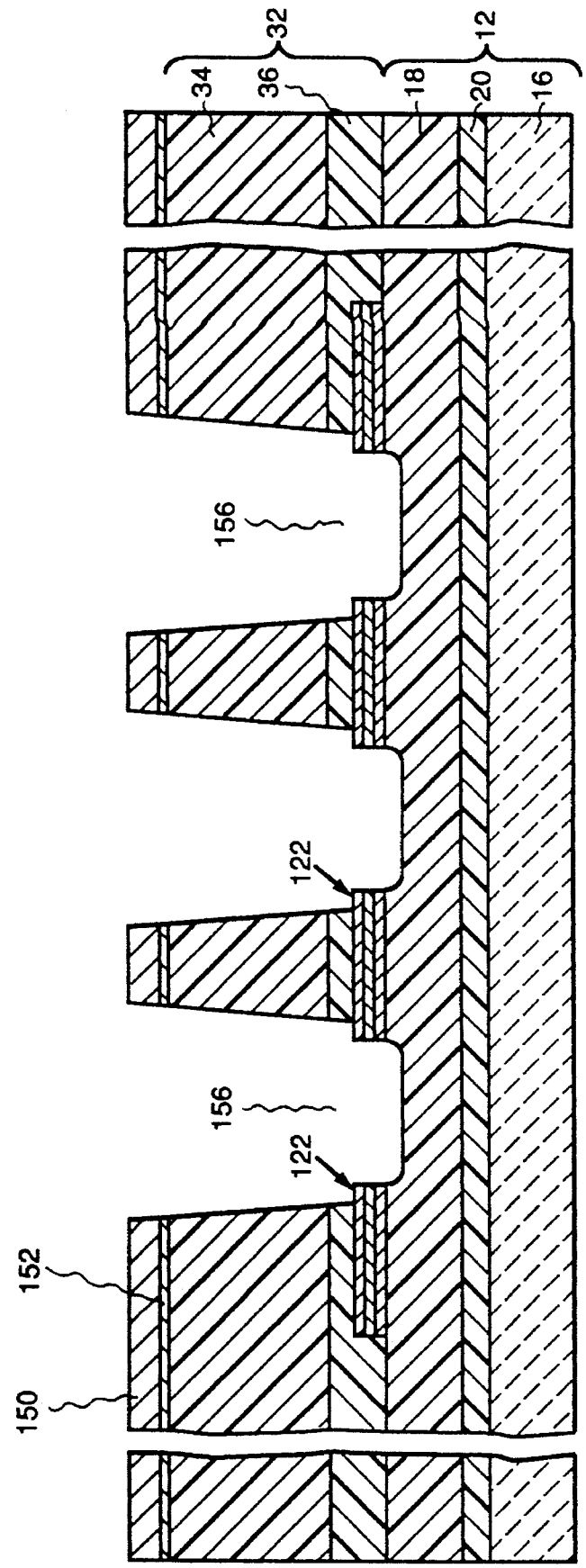

Initial sacrificial layer 150 of FIG. 6B is patterned by masking and chemical etching (not shown) to produce the structure shown in FIG. 6C, which is comparable to the structure shown in FIG. 3E since portions of initial sacrificial layer 150 which remain define openings 154.

As depicted in FIG. 6C, portions of electrodes 122 are next exposed. This may be accomplished by laser drilling through cavity-supporting polymer layer 32, forming cavities 156. A slight overetch into Kapton layer 18 of base 12 is expected, and causes no particular harm.

Contrasting FIG. 6C with FIG. 3F of the previous embodiment, it will be apparent in FIG. 6C that the openings in sacrificial layer 150 which define the locations of cavities 156 are positioned such that two stationary switch contacts 122 are exposed at the bottom of a single cavity 156 such that the two stationary switch contacts 122 can be electrically bridged by a single movable switch contact, in contrast to the structure shown in FIG. 3F where only a single stationary switch contact 22 is exposed at the bottom of each cavity 40.

Figure 6D:
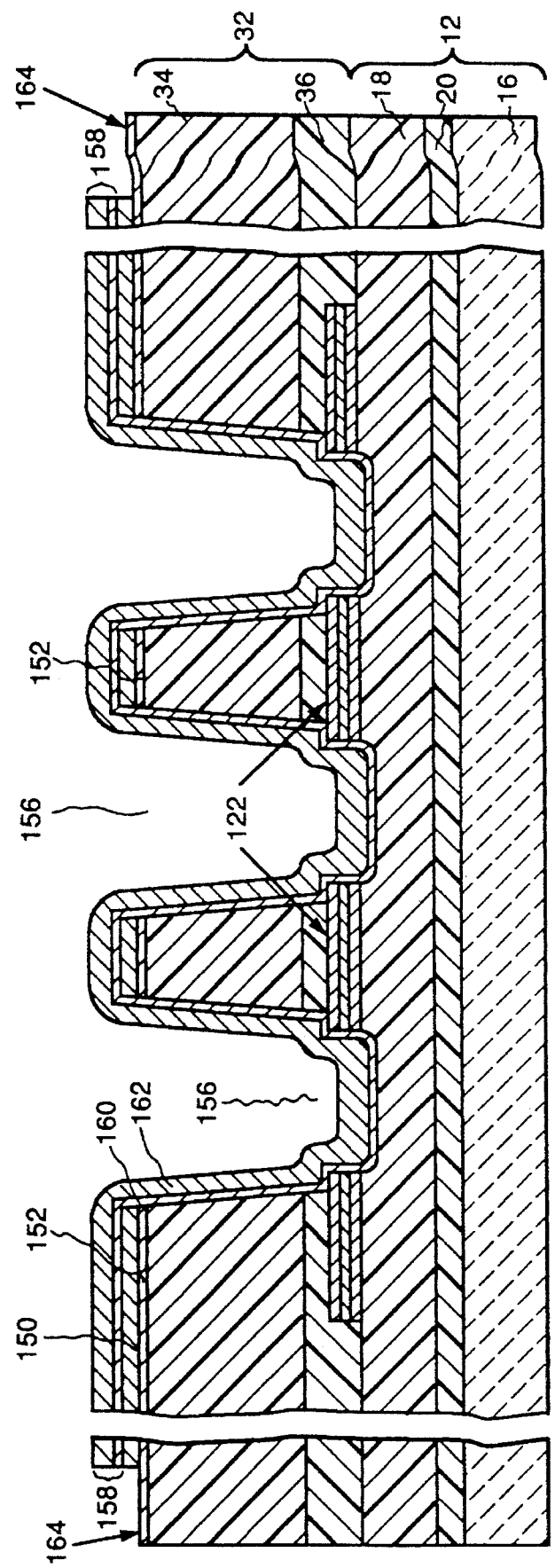

FIG. 6D depicts a lining sacrificial layer 158 deposited over the entire assembly surface, including the cavity walls and bottoms. As described hereinabove with reference to the lining sacrificial layer 96 shown in FIG. 3G, lining sacrificial layer 158 in FIG. 6D may comprise a sublayer 160 of sputtered copper 4000 Å in thickness, followed by an eight-micron thickness electroplated copper sublayer 162. Sacrificial layers 150 and 158 are then etched to leave plate anchor points 164.

As noted above, by employing two sacrificial layers 150 and 158 over the planar surface of cavity-supporting polymer dielectric layer 32, but only one sacrificial layer in cavities 156, when the structure is completed, the separation between the movable upper layer and the lower fixed structure is always smaller within the cavities than outside, ensuring that mechanical contact initially occurs with the stationary electrodes 122.

Figure 6E:
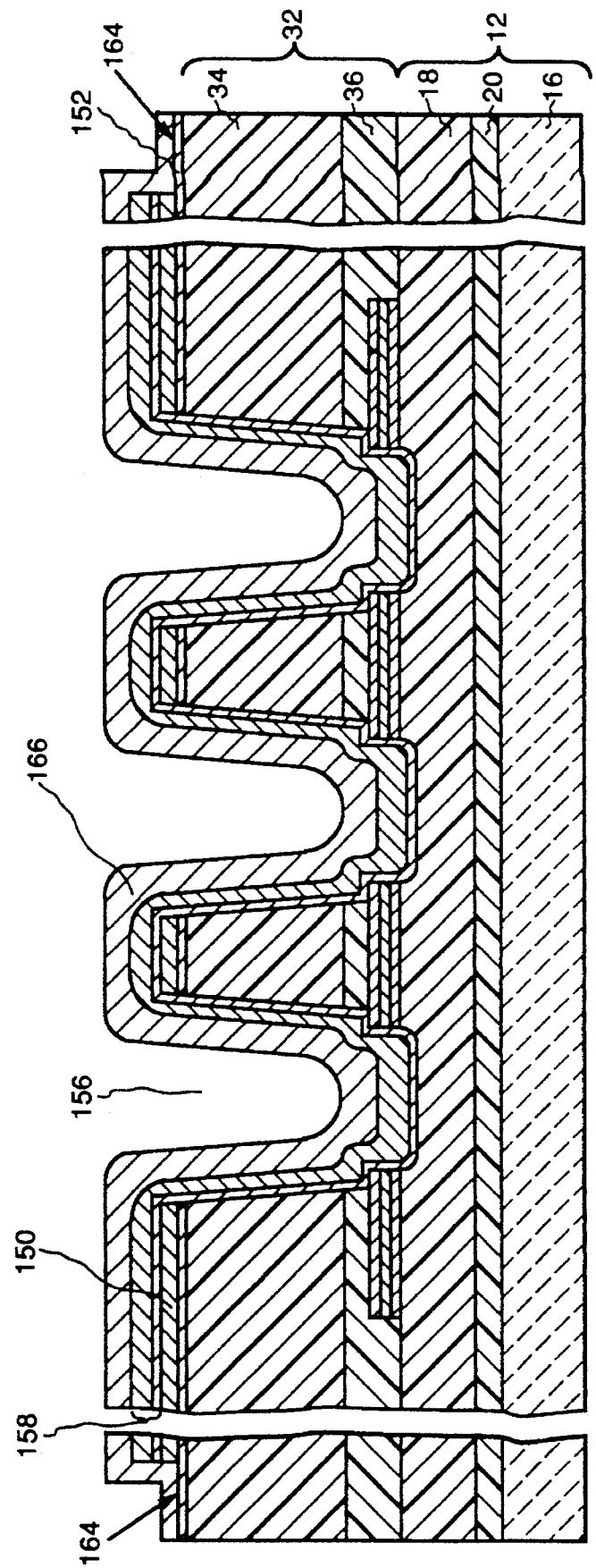

FIG. 6E illustrates the evolving switch structure as including a second gold layer 166, formed in a manner comparable to the formation of upper conductive layer 44 as described hereinabove with reference to FIG. 3H. The result is a conformal layer on the entire structure, which conformal layer includes plunger-like movable switch contact structures 166 having cavities 168.

In the event copper sacrificial layers 150 and 158 are not employed, then conductive layer 166 may comprise copper.

Figure 6F:
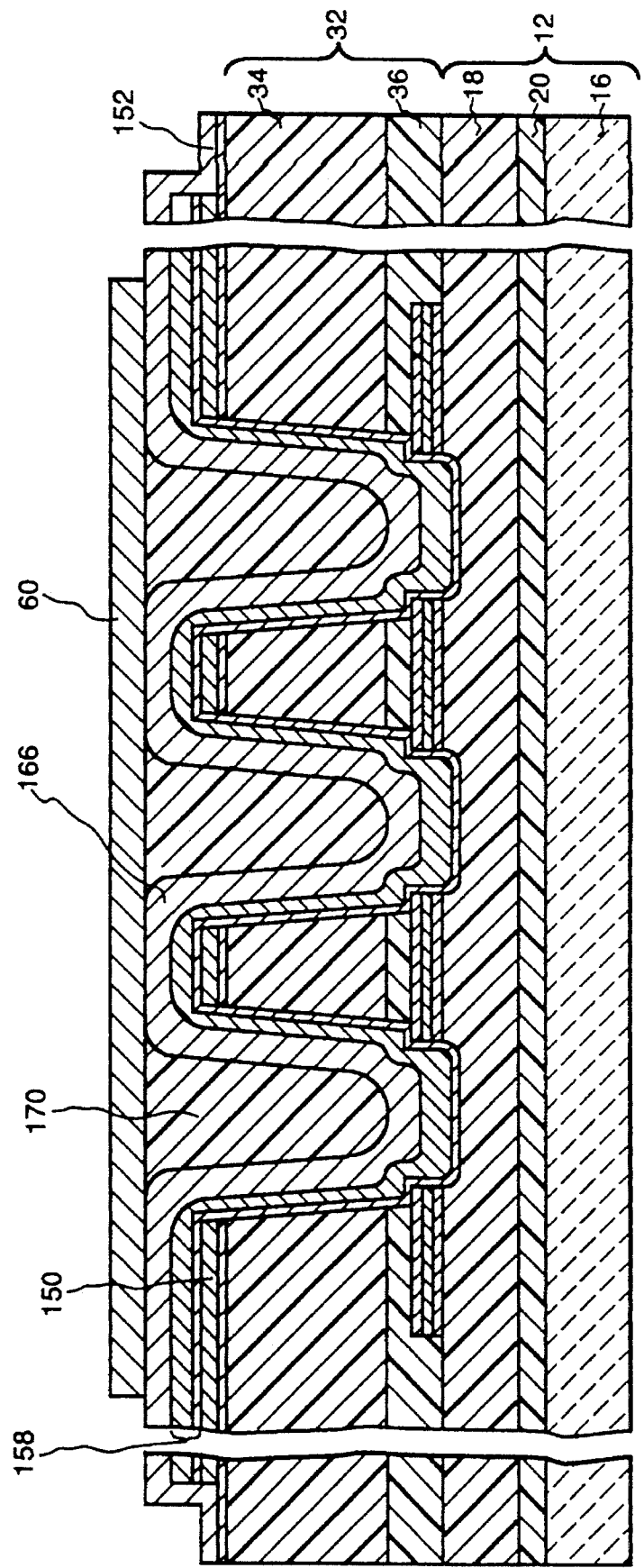

To add rigidity to the structure, cavities 156 are filled with an epoxy-type material 170, as shown in FIG. 6F, and excess epoxy is removed by reactive ion etching employing gold layer 166 as an etch stop. Layer 158 is then patterned in the same manner as outer conductive layer 44 of FIGS. 1 and 2. Either at this juncture, or at a subsequent stage, ferromagnetic actuator 60 is attached to conductive layer 166, as by use of epoxy glue (not shown).

In order to release conductive layer 158 for axial movement of movable switch contacts 166, the initial and lining sacrificial layers 150 and 158, respectively, are replaced by an air gap by selectively etching the sacrificial layers to arrive at the structure depicted in FIG. 5. In the case of aluminum or molybdenum sacrificial layers, a suitable selective etch is (conc. $H_3PO_4$: conc. $HNO_3$=96:4 by volume).

Although the embodiments described hereinabove employ copper or another metal such as molybdenum or aluminum as the sacrificial material, it is contemplated that other sacrificial materials may alternatively be employed, such as organic materials. One such example is polymethylmethacrylate (PMMA), which can be removed by a solvent such as methylene chloride, which does not dissolve Kapton polyimide.

While specific embodiments of the invention have been illustrated and described herein, it is realized that numerous modifications and changes will occur to those skilled in the art. It is therefore to be understood that the appended claims are intended to cover all such modifications and changes as follows in the true spirit and scope of the invention.

What is claimed is:

1. A micromachining method for fabricating a micromechanical structure which includes a plunger element free to reciprocate within a cavity, comprising the steps of:

providing a base having a generally planar surface;

applying a layer of polymer material on the base;

forming a cavity in the polymer layer extending at least partially through the polymer layer;

conformally depositing a lining sacrificial layer within the cavity and over the layer of polymer material;

conformally forming an outer layer on the lining sacrificial layer, a portion of the outer layer within the cavity comprising the plunger element; and releasing the outer layer for axial movement within the cavity relative to the layer of polymer material by employing a selective etch to remove the lining sacrificial layer.

2. The method of claim 1, wherein the step of forming a well-like cavity includes forming the cavity to extend entirely through the polymer layer.

3. The method of claim 1, which further comprises, prior to the step of forming a cavity in the polymer layer, depositing an initial sacrificial layer onto the layer of polymer material to provide greater sacrificial layer thickness on the layer of polymer material compared to sacrificial layer thickness within the cavity; and wherein the step of forming a well-like cavity includes forming the cavity to extend through the initial sacrificial layer.

4. The method of claim 1, wherein the step of forming a cavity comprises laser-ablating a predetermined portion of said polymer layer.

5. The method of claim 1, wherein the step of forming a cavity comprises:

providing a metal mask over the polymer layer, with an opening in the metal mask defining the cavity location; and ablating with a laser the polymer layer where not masked.

6. The method of claim 3, wherein:

the initial sacrificial layer comprises a metal; and wherein the said step of forming a cavity comprises:

forming an opening in the initial sacrificial layer defining the cavity location, and employing a laser to ablate the polymer layer where not masked by said initial sacrificial layer.

7. The method of claim 1, wherein the step of conformally depositing a lining sacrificial layer comprises depositing a metal layer.

8. The method of with claim 7, wherein the step of conformally depositing a lining sacrificial layer comprises copper electroplating.

9. The method of with claim 3, wherein the steps of depositing an initial sacrificial layer and depositing a lining sacrificial layer each comprise depositing a metal layer.

10. The method of claim 9, wherein the steps of depositing an initial sacrificial layer and depositing a lining sacrificial layer comprise copper electroplating.

11. A micromachining method for fabricating a micromechanical electric switch comprising the steps of:

providing an electrically-insulative base having a generally planar surface;

forming a patterned first conductive layer on the base, portions of the patterned first conductive layer comprising stationary switch contacts;

applying a cavity-supporting polymer dielectric layer to the base and over the patterned first conductive layer thereon;

exposing the stationary switch contacts by forming at least one cavity extending through the cavity-supporting polymer dielectric layer;

conformally depositing a lining sacrificial layer within the at least one cavity and over the cavity-supporting polymer dielectric layer;

conformally forming a second conductive layer over the lining sacrificial layer such that at least one portion of the second conductive layer within the at least one cavity can serve as at least one movable switch contact; and releasing the second conductive layer for axial movement of the at least one movable switch contact within the at least one cavity relative to the cavity-supporting polymer dielectric layer by employing a selective etch to remove the lining sacrificial layer.

12. The method of claim 11, which further comprises, prior to the step of exposing the stationary switch contacts, depositing an initial sacrificial layer over the cavity-supporting polymer dielectric layer to provide greater sacrificial layer thickness over the cavity-supporting polymer dielectric layer compared to sacrificial layer thickness within the at least one cavity; and wherein the step of exposing the stationary switch contacts includes forming a the cavity to extend through the initial sacrificial layer as well as through the cavity-supporting polymer dielectric layer.

13. The method of claim 11, wherein the step of exposing the stationary switch contacts comprises laser-ablating a predetermined portion of said polymer layer.

14. The method of claim 11, wherein the step of exposing the stationary switch contacts comprises:

providing a metal mask over the cavity-supporting polymer dielectric layer, with at least one opening in the metal mask defining the location of the at least one cavity; and laser-ablating the cavity-supporting polymer dielectric layer at locations not masked by said metal mask.

15. The method of claim 12, wherein:

the initial sacrificial layer comprises a metal; and wherein the step of exposing the stationary switch contacts comprises:

employing the sacrificial layer as a mask layer by forming at least one opening in the initial sacrificial layer defining the location of the at least one cavity; and laser-ablating the cavity-supporting polymer dielectric layer at locations not masked by said initial sacrificial layer.

16. The method of claim 11, wherein the step of conformally depositing a lining sacrificial layer comprises depositing a metal layer.

17. The method of claim 16, wherein the step of conformally depositing a lining sacrificial layer comprises copper electroplating.

18. The method of claim 16, wherein the steps of forming first and second conductive layers each comprises forming the respective conductive layer of a metal resistant to the selective etch employed to remove the lining sacrificial layer.

19. The method of claim 17, wherein the steps of forming first and second conductive layers each comprises forming the respective conductive layers of gold.

20. The method of claim 12, wherein the step of depositing an initial sacrificial layer and the step of depositing a lining sacrificial layer each comprises depositing a metal layer.

21. The method of claim 20, wherein the step of depositing an initial sacrificial layer and the step of depositing a lining sacrificial layer each comprises copper electroplating.

22. The method of claim 20, wherein the steps of forming first and second conductive layers each comprises forming the respective conductive layer of a metal resistant to the selective etch employed to remove the sacrificial layers.

23. The method of claim 21, wherein the steps of forming first and second conductive layers each comprises forming a gold conductive layer.

24. The method of claim 11, wherein the step of exposing the stationary switch contacts comprises forming said at least one cavity at a location where two stationary switch contacts are exposed at the bottom of said at least one cavity such that the two stationary switch contacts can be electrically bridged by a single movable switch contact.

25. The method of claim 11, wherein the step of exposing the stationary switch contacts comprises forming said at least one cavity and a second cavity at respective locations where a single stationary contact is exposed at the bottom of each of said cavities, respectively, such that the two stationary contacts can be electrically connected through respective movable switch contacts comprising portions of the second conductive layer.

26. A micromachining method for fabricating a micromechanical electric switch comprising the steps of:

providing an electrically-insulative base having a generally planar surface;

forming a patterned first conductive layer on the base, portions of the patterned first conductive layer comprising stationary switch contacts;

applying a cavity-supporting polymer dielectric layer to the base and over the patterned first conductive layer thereon;

exposing the stationary switch contacts by forming a plurality of cavities extending through the cavity-supporting polymer dielectric layer;

conformally depositing a lining sacrificial layer within said cavities and over the cavity-supporting polymer dielectric layer;

conformally forming a second conductive layer over the lining sacrificial layer such that portions of the second conductive layer within said cavities will serve as movable switch contacts; and releasing the second conductive layer for axial movement of the movable switch contacts within said cavities relative to the cavity-supporting polymer dielectric layer by employing a selective etch to remove the lining sacrificial layer.

27. The method of claim 26, which further comprises the step of attaching an actuator to said second conductive layer.

* * * * *